(12) United States Patent
Burgin et al.

(10) Patent No.: US 11,169,883 B1
(45) Date of Patent: Nov. 9, 2021

(54) USER AND SYSTEM INITIATED INSTANCE HIBERNATION

(71) Applicant: Amazon Technologies, Inc., Seattle, WA (US)

(72) Inventors: Joshua Marc Burgin, Seattle, WA (US); Joby Sky Lafky, Seattle, WA (US); Anupama Sharma, Seattle, WA (US); Jacob Adam Gabrielson, Seattle, WA (US); Derek Solomon Pai, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 338 days.

(21) Appl. No.: 15/587,355

(22) Filed: May 4, 2017

(51) Int. Cl.
*G06F 9/4401* (2018.01)
*G06F 11/14* (2006.01)
*G06F 1/3287* (2019.01)

(52) U.S. Cl.
CPC ........ *G06F 11/1438* (2013.01); *G06F 1/3287* (2013.01); *G06F 9/4418* (2013.01)

(58) Field of Classification Search
CPC .................................................. G06F 11/1438
See application file for complete search history.

(56) References Cited

U.S. PATENT DOCUMENTS

| 9,674,302 | B1* | 6/2017 | Khalid | H04L 67/1002 |
| 2006/0294351 | A1* | 12/2006 | Rostampour | G06F 9/4862 713/1 |
| 2008/0201414 | A1* | 8/2008 | Amir Husain | G06F 9/445 709/203 |
| 2008/0222633 | A1* | 9/2008 | Kami | G06F 9/5077 718/1 |
| 2011/0004708 | A1* | 1/2011 | Kondo | G06F 3/0614 710/38 |
| 2012/0084445 | A1* | 4/2012 | Brock | G06F 9/5077 709/226 |
| 2013/0227554 | A1* | 8/2013 | Tsirkin | G06F 9/45558 718/1 |
| 2014/0245294 | A1* | 8/2014 | Kaul | G06F 9/45558 718/1 |

\* cited by examiner

*Primary Examiner* — Kim Huynh
*Assistant Examiner* — Eric Chang
(74) *Attorney, Agent, or Firm* — Davis Wright Tremaine LLP

(57) ABSTRACT

A computing resource service provider provides computing resources to customers, for example, computer system instances supported by server computer systems. These computer system instances may include logical volumes to support execution of the computer system instance. In addition, these instances may be terminated from time to time for various reasons. A stop signal transmitted to computing resource supporting a particular computer system instance may indicate that the particular computer system instance is to be terminated. In response to termination, the particular computer system instance may operate in accordance to a particular behavior.

21 Claims, 11 Drawing Sheets

USER AND SYSTEM INITIATED INSTANCE HIBERNATION

BACKGROUND

To facilitate the utilization of data center resources, virtualization technologies may allow a single physical computing machine to host one or more instances of virtual machines that appear and operate as independent computer machines to a connected computer user. With virtualization, the single physical computing device can create, maintain, or delete virtual machines in a dynamic manner.

In a large distributed computing system (e.g., multiple distributed data centers) of a computing resource service provider, various customers, users, services, and resources of the computing resource service provider are frequently shared between customers. In addition, these computing resources are often leveraged in large-scale networks of computers, servers and storage drives to enable clients, including content providers, online retailers, customers, and the like, to host and execute a variety of applications and web services. The usage of network computing allows content providers and customers, among others, to efficiently and adaptively satisfy their computing needs. However, with the growing use of virtual resources, customers are encountering situations in which the virtual resources cannot accommodate their needs during certain situations, such as unanticipated traffic spikes or need for immediate responses to satisfy increased loads. In response to this, computing resource service providers are introducing automated mechanisms to handle unanticipated traffic spikes or customer needs. In many cases, customers transmit requests to create instances such as, for example, virtual machine instances to execute on hardware devices. The instance can be used by the customer to satisfy their computing needs but may not be able to respond adequately to customer needs during unanticipated traffic spikes or needs.

BRIEF DESCRIPTION OF THE DRAWINGS

Various techniques will be described with reference to the drawings, in which.

DETAILED DESCRIPTION

Figure 1:
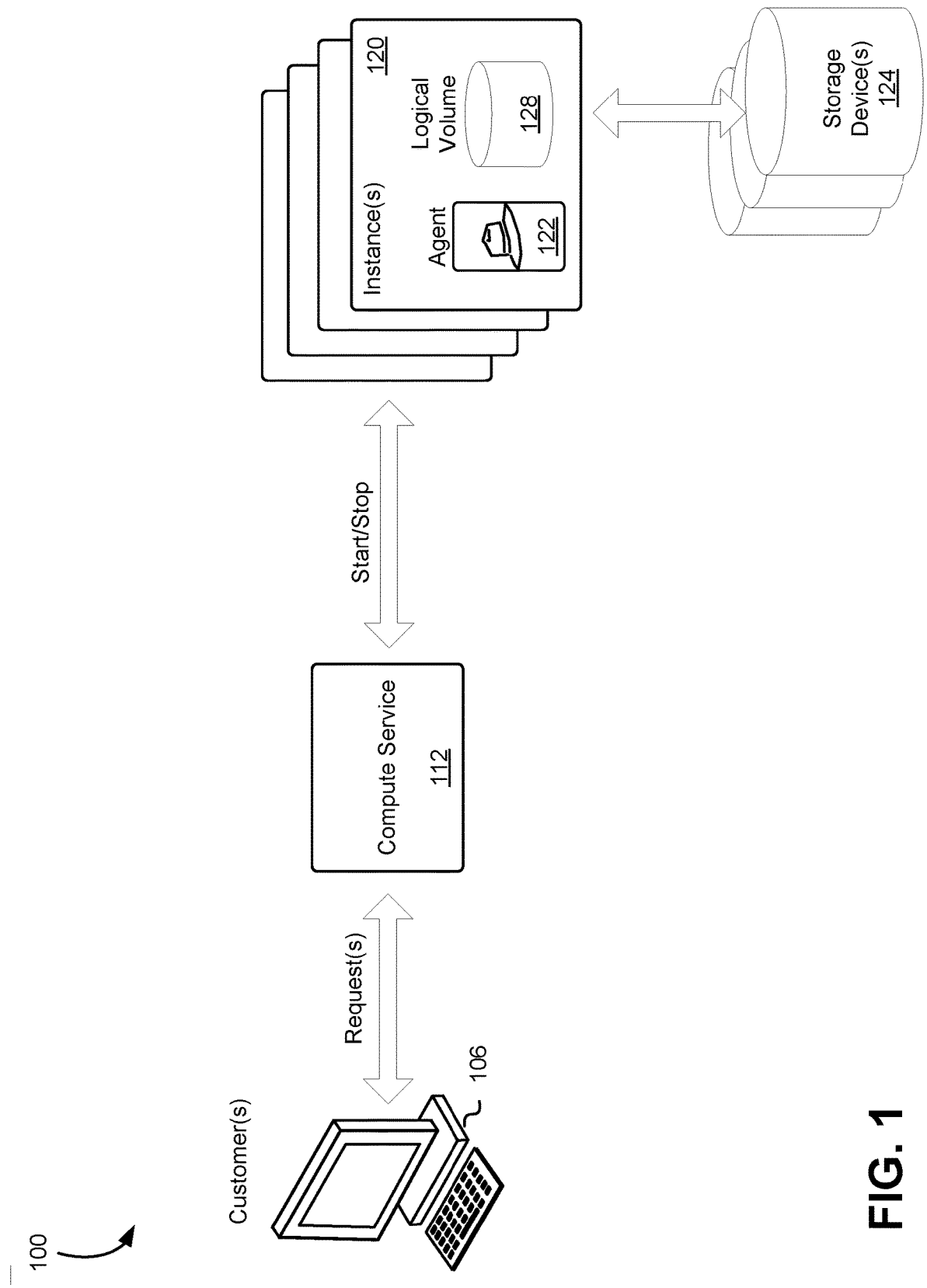
FIG. 1 illustrates an environment in which an agent executed by a computer system instance may manage hibernation of the computer system instance in accordance with an embodiment.

In various examples, a customer of a computing resource service provider selects a hibernation behavior for computer system instances operated by the customer using computing resources of the computing resource service provider. The computing resource service provider may operate a plurality of data centers containing computing resources used to support the execution of computer system instances operated by a plurality of customers. The computing resource service provider may provide a customer with access to the computing resources through various services, such as a compute service or other services described in greater detail below. In response to various events, such as capacity events, power events, or maintenance events, modifications may need to be made to the computing resources used to support the execution of customer operated computer system instances. In various embodiments, to reduce the impact on customers, hibernation of the computer system instances is provided.

In an embodiment, the customer indicates (e.g., through a user interface or service call) hibernation as a behavior for the customer's computer system instances. In addition to this indication, the customer and/or computing resource service provider causes an agent to be executed by the customer's computer system instance. As described in greater detail below, the agent manages hibernation of the computer system instance. In response to an event, in various embodiments, a compute service or other service or component of the computing resource service provider transmits a stop signal to the host computer systems supporting the computer system instances terminated and/or hibernated. For example, the stop signal is transmitted to a network address associated with the host computer system. In some embodiments, the computer system instance may be terminated but a logical volume attached to the computer system instance is maintained. The logical volume can later be used to instantiate a new computer system instance. In various embodiments, described in the present disclosure hibernation of the computer system instances results in termination of the computer system instance at the completion of hibernation operations.

In yet other embodiments, the agent may detect the stop signal and transmit a request to an operating system executed by the computer system instance to initiate hibernation of the computer system instance. The stop signal may indicate an interval of time at the expiration of which the computer system is to be terminated. In addition, the agent may monitor execution of various hibernation operations and ensure that the computer system instance hibernates prior to termination of the instance. For example, the agent prepares a hibernation file on a logical volume attached to the computer system instance and reads and/or writes to various sectors of the hibernation file to ensure that the hibernation file is operational. In yet another example, a delay signal is transmitted to the compute service if the computer system instance is unable to complete hibernation operations prior to expiration of the interval of time. The delay signal may be transmitted by a virtualization layer or other component of a server computer system execution to the computer system instance. In some embodiments, the events that cause the compute service to transmit a stop signal include testing events that are initiated to test a customer application's ability to restart after hibernation (e.g., resume normal operation after a restart from a logical volume including a hibernation file).

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment 100 in which a customer 106 may provide requests to a compute service 112 to define the behavior of computer system instance 120 operated by the customer 106 in accordance with an embodiment. The compute service 112, described in greater detail below, may be provided to the customer 106 by a computing resource service provider. In addition, the compute service 112, in an embodiment, allows the customer 106 to interact with and otherwise operate computer system instance 120 supported by computing resources of the computing resource service provider. The computing resource service provider may provide a variety of services to the customer 106, and the customer 106 may communicate with the computing resource service provider through service calls transmitted over a network to an interface (not shown in FIG. 1), which may be a web service interface or any other type of customer interface. Although only the compute service 112 is shown in FIG. 1, the computing resource service provider may provide a variety of services to the customer 106. Furthermore, each service may have its own interface and, generally, subsets of the services may have corresponding interfaces in addition to or as an alternative to a single interface for the computing resource service provider.

In an embodiment, the customer 106 is an organization that may utilize one or more of the services provided by the computing resource service provider to maintain and deliver information to various entities, which may be located in various geographical locations. In yet other embodiments, the customer 106 includes individuals who utilize the services of the computing resource service provider for remote application execution. The customer 106 may communicate with the computing resource service provider through a network such as the Internet, an intranet or an Internet service provider (ISP) network. Some communications from the customer 106 to the computing resource service provider may cause the computing resource service provider to operate in accordance with one or more embodiments described in the present disclosure. For example, the customer 106 sends a request to the compute service 112 for a computer system instance 120, the request indicating that the computer system instance 120 is to generate a hibernation file in response to a stop signal. In another example, the customer 106 sends a request to the compute service 112 for a computer system instance 120, the request indicating that the computer system instance 120 is to be a stop instance, such that in response to a stop signal the instance is terminate but a logical volume attached to the instance in maintained.

Accordingly, at least a portion of the communications from the customer 106 may include requests that cause the computing resource service provider or component thereof, such as the compute service 112, to perform various operations to instantiate computer system instance 120 and to operate in accordance with a behavior indicated by the customer 106 in the request. For example, the customer 106 may provide the compute service 112 with an application programming interface (API) call to instantiate a set of computer system instance 120 and to operate as hibernation instance (e.g., to perform hibernation operations in response to a particular signal). Furthermore, the API call may include one or more constraints (e.g., not to exceed a certain price) or capacity requirements (e.g., number of processors) for the customer workload or application. For example, the API call may include information suitable for indicating an amount of computing capacity required, an amount of memory required, an amount of storage space required, a cost associated with executing the customer workload or application, execution time associated with the customer workload or application, a benchmark associated with various instance types, performance requirements of the customer workload or application, or any other constraint or requirement of the customer workload or application.

As described in greater detail below, the compute service 112 may cause host computer systems (e.g., server computer systems) to execute the instances 120 in response to requests from the customer 106. In addition, these host computer systems may execute a plurality of instances operated by a plurality of customers to enable the computing resource service provider to leverage the host computer systems and service a large number of customers with varying requirements and workloads. For example, the computing resource service provider operates a spot market for computer system instance 120 within which the customer 106 can specify a desired price for a particular computer system instance or type of computer system instances. The price for computing resources within this spot market may fluctuate based at least in part on the supply (e.g., amount of free or unused computing resources) and demand (e.g., the number of customers requesting instances). When operating computer system instance 120 within the spot market, the customer 106 may be subject to termination of the customer's 106 computer system instance 120 based at least in part on price fluctuations in the spot market. In various embodiments, if the customer's 106 computer system instance 120 is to be terminated, a signal is transmitted to the computer system instance 120. The signal may enable the customer 106 and/or computer system instance 120 to perform various operations, as described in the present disclosure, to reduce the impact of the termination on the customer's 106 workload and/or application (e.g., the application executed by the customer's 106 computer system instance 120).

Various other events may cause the compute service 112 or other service or component of the computing resource service provider to transmit a signal (e.g., stop signal) to the computer system instance 120. For example, a particular host computer system experiences a hardware error that requires the host computer system to be powered off to repair. In this example, a stop signal is sent to the host computer system indicating to the computer system instances executed by the host computer system that the computer system instances will be terminated to allow the host computer system to be repaired. In another example, the host computer system has insufficient capacity to support all the computer system instance 120 currently being supported by the host computer system and, as a result, the compute service 112 determines a number of computer system instance 120 to terminate to reduce the load on the host computer system. As in the example above, a signal may be transmitted to the computer system instance 120 to be terminated and/or the host computer system to enable the computer system instance 120 to be terminated to perform various operations, such as hibernation, to reduce the impact of the termination.

In various embodiments, the computer system instances 120 include an agent 122 to manage and/or perform various operations to reduce the impact of termination, such as hibernation of the computer system instance 120. The agent 122 may include an application or other executable instructions that, as a result of being executed by one or more processors (e.g., a virtual processor of the computer system instances exposed by a hypervisor of a host computer system enabling access to one or more processors of the host computer system), causes the host computer system to perform various operations to reduce the impact of termination. For example, the agent 122 polls computer system instance metadata, described in greater detail below, to determine that the computer system instance 120 will be terminated and transmit a request to an operating system of the computer system instance 120 to create a hibernation file on a logical volume attached to the computer system instance 120. The agent 122, in various embodiments, is a program installed on the operating system, a component of the operating system of the computer system instance, and/or has privileged access to function of the operating system to perform various operations described in the present disclosure such as hibernation of the computer system instance 120.

The logical volume 128 may be a virtualization of a block-level storage device provided by a service of the computing resource service provider, such as a block-level storage service. In addition, the logical volume 128 may be exposed to the computer system instance through a hypervisor as described in greater detail below. During hibernation operations the computer system instance 120 or component thereof, such as the agent or operating system, may cause the current state (e.g., memory, instructions, metadata, etc.) to be stored on the logical volume 128. The logical volume 128 may then be stored as a hibernated instance by the block-level storage service or other service of the computing resource service provider in one or more storage devices 124. In an embodiment, the computer system instance 120 communicates over a network to the logical volume 128 (e.g., input and output requests directed towards the logical volume are transmitted over a network to a host computer system including a storage device supporting the logical volume). In such embodiments, when the computer system instance 120 is terminated, the logical volume is maintained by the block-level storage service and can be used to restart the computer system instance 120 with the identical state existing prior to termination. In this way, the impact of termination on the customer 106 can be reduced and execution of the customer's 106 workload and/or application may be resumed from its previous state.

In various embodiments, either prior to execution or during execution of the customer workload or application the agent 122 may prepare the logical volume 128 to store the computer system instance's 120 state information (e.g., hibernation data). In addition, after a computer system instance that has been hibernated is restarted, the agent 122 may determine if the computer system instance 120 restarted correctly from hibernation (e.g., regained the previous state prior to termination). In various embodiments, the agent 122 also provides notifications to the customer 106 indicating whether various operations (e.g., stop and start) have performed successfully. In these situations, a notification service (not illustrated in FIG. 1 for simplicity) or other component of the computing resource service provider may provide the customer 106 with notification generated by the agent 122. For example, the agent 122 detects a particular computer system instance has failed to reboot from the logical volume 128 and causes the notification service to transmit a notification to the customer 106.

The notification service may include various computing resources that provide a web service or other interface and browser-based management console as described in greater detail below. The web service or other interface may be responsible for providing the customer 106 with notification as well as receiving input from the customer 106. The management console, described in greater detail below, can be used to configure topics for which customers seek to receive notifications, configure computer system instances, subscribe clients to the topics, publish messages, or configure delivery of the messages over clients' protocol of choice (i.e., hypertext transfer protocol (HTTP), e-mail and short message service (SMS), among others). The notification service may provide notifications to clients using a "push" mechanism without the need to periodically check or "poll" for new information and updates. The notification service may further be used for various purposes such as monitoring for events, transmitting signals to computer system instances, time-sensitive information updates, and any other signal or notification to be provided as described in the present disclosure.

Figure 2:
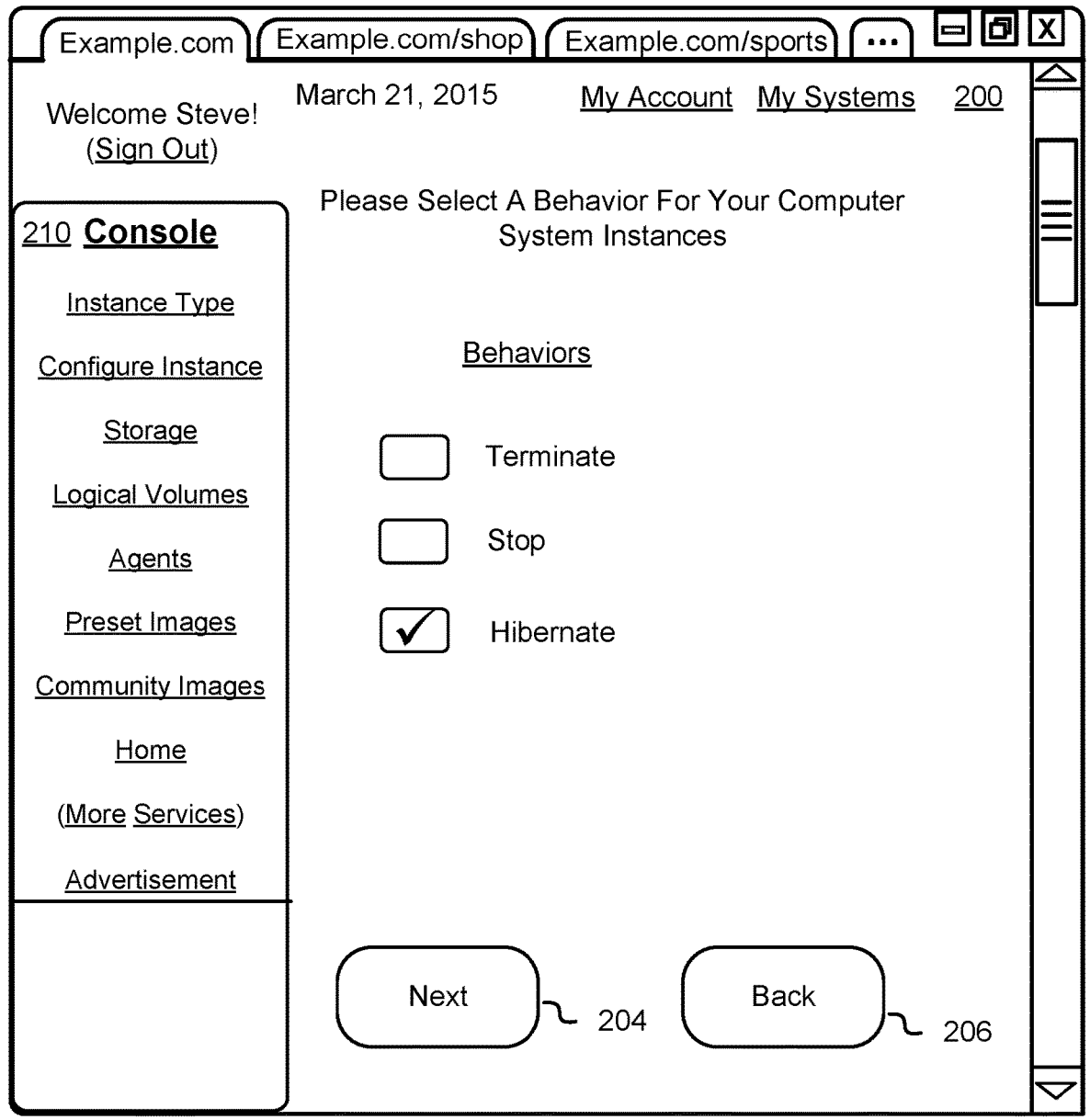
FIG. 2 is a diagram illustrating a management console exposed as a webpage enabling customers to select a behavior for computer system instances in accordance with at least one embodiment.

FIG. 2 shows a webpage 200 which may be displayed by an application executed by a computing system enabling a user to interact with a compute service operated by the computing resource service provider in accordance with an embodiment. As illustrated in FIG. 2, the webpage 200 includes various graphical user interface elements that enable customers to indicate a behavior of a set of computer system instances provided by the compute service using computing resources of the computing resource service provider through a management console of which the webpage 200 is a part. In various embodiments, the user interacts with the compute service by issuing commands through the management console. The webpage 200 may be displayed by various applications, such as a mobile application or web browser. In this example, the webpage 200 includes various navigational features.

For instance, on the left-hand side of the webpage 200, various links 210 may link to one or more other webpages that contain additional content corresponding to a variety of different actions the user may cause to be performed. For example, the link "Logical Volumes," when selected by the customer using an input device causes the computing device displaying the webpage 200 to transmit a request for a webpage associated with the link. As described in greater detail below, the customer, through the management console, may interact with logical volumes containing hibernated computer system instances to perform a variety of operations such as cloning the logical volume, modifying the logical volume, deleting the logical volume, attaching the logical volume to another computer system instance, modifying an attribute of the computer system instance associated with the logical volume, obtaining information from the logical volume, or any other operation or interaction that may be performed with a logical volume.

The console web pages may correspond to operations that may be taken to manage or otherwise control computer system instances of various types provided by the compute service or other computing services of the computing resource service provider. In this example, the links appear as textual words which enable the links to be selected using an appropriate input device such as a keyboard, mouse, touchscreen, or other input device. Selection of one of the links 210 may cause an application displaying the webpage 200 to submit, pursuant to a Uniform Resource Locator (URL) associated with the selected link by the programming of the webpage 200, a request, such as an HTTP request, for the content associated with the link to a server that provided the webpage 200 or another server.

In this example, the webpage 200 also includes a graphical user element configured as a "next" button 204. The next button 204 may be a graphical user interface element of the webpage 200 where the underlying code of the webpage 200 is configured such that selection by an input device of the next button 204 causes information corresponding to the selection of a particular behavior selected on the webpage 200 to be transmitted to the compute service. Furthermore, through the management console, the user may be guided through the process of selecting various constraints and/or requirements associated with execution of the set of computer system instances. The process may be divided into steps and the user may be prompted to provide information at each step. For example, the webpage 200 displays to the user a list of different types of computing system instances suitable for executing the customer workload or application.

In various embodiments, webpage 200 is displayed as part of a process enabling the customer, using an input device, to select a set of computer systems instances to execute the customer workload, application, or other operations indicated by the customer. Additionally, the customer may indicate a preference for executing the set of computer systems instances with an indicated behavior. For example, as described above and illustrated in FIG. 2, computer system instances may be terminated (e.g., both current state and attached logical volumes are deleted), stopped (e.g., an attached logical volume is maintained but the current state is lost), or hibernated (e.g., the current state is stored on the attached logical volume and the logical volume is maintained). The user selection may be stored until the entire process is completed, or the user selection may be transmitted to the compute service upon selection of a graphical user interface element.

As illustrated in FIG. 2, the webpage 200 may contain a graphical user interface element displayed as a check box to enable the user to select a desired behavior for the set of computer system instances. In an embodiment, the behavior corresponds to a particular operation or operations performed by the computer system instances in response to signal from the compute service. For example, if hibernate is selected, this causes an agent executed by the computer system instances to monitor for a stop signal or other hook and, if detected, to cause the computer system instance to store the current execution state to a logical volume as described above in connection with FIG. 1. As another example, if stop is selected, this causes the compute service or other service of the computing resource service provider, such as a storage service, to maintain a logical volume attached to the computer system instances after termination of the computer system instances.

The webpage 200 may also include a graphical user element configured as a "back" button 206. The back button 206 may be a graphical user interface element of the webpage 200 where the underlying code of the webpage 200 causes the application displaying the webpage 200 to transmit a command to the computing systems to return to a previously navigated webpage of the management console. In this example, the webpage 200 contains a prompt asking the user to select the desired behavior for the customer computer system instances as described above in connection with FIG. 2. The selected behavior may be applied to all of the customer's computer system instances or a subset thereof.

Once the user has made a selection using the webpage 200 and selected the next button 204, the application displaying the webpage 200 may submit a request, such as an HTTP request, to the compute service to set the behavior of the computer system instances. For example, the compute service maintains instance metadata indicating various attributes of a particular computer system instance. The request may be transmitted to one or more servers of the compute service operated by the computing resource service provider. Furthermore, the compute service may obtain additional information from one or more other services in order to complete the request from the user. For example, the compute service may obtain auto scaling and/or load balancing information from an auto-scale service and/or load balancing service as described in greater detail below.

The compute service may, in response to the customer selecting the next button 204 with an input device, instantiate a group of computer system instances according to the selected behavior. In various embodiments, the compute service or other service of the computing resource service provider returns in response to the request, such as an HTTP request, from the customer, an indication that the behavior of a set of computer system instances currently executing and/or operated by the customer has been modified. For example, the customer transmits a request to modify the behavior of a computer system instance that is currently stopped (e.g., the logical volume associated with the computer system instances is currently being stored) to terminate or hibernate such that the next time the computer system instance is instantiated it will execute in accordance with the selected behavior indicated in the request.

The environment such as that illustrated in FIG. 1 may be useful for a service provider such as a computing resource provider, wherein the computing resource system responds to requests from customers to manage computer system instances (e.g., computer system instance operation and behavior) that execute a customer workload, application, or other operations. As discussed above, the computing resource system provides a mechanism to allow customers to provide an indication of a particular behavior associated with computer system instances in response to a particular signal, such as a stop signal or a start signal as described in the present disclosure. The environment in such a case may include additional components and/or other arrangements, such as those illustrated in the networked environment 300 of FIG. 3.

Figure 3:
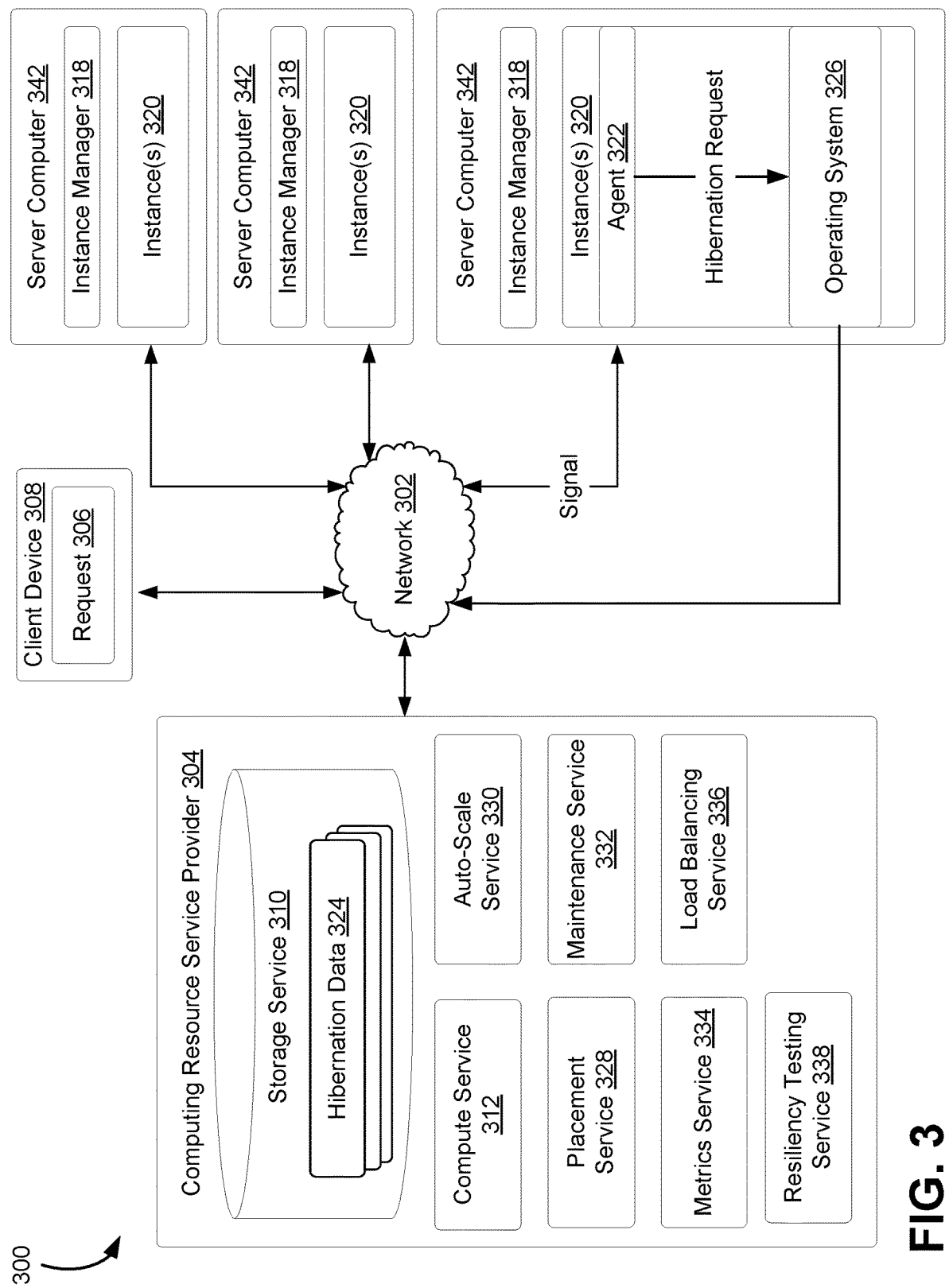
FIG. 3 illustrates an environment in which an agent executed by a computer system instance may manage hibernation of the computer system instance in accordance with an embodiment.

In the example illustrated in FIG. 3, the networked environment 300 includes a computing resource service provider 304 in data communication with a client device 308 and server computer system 342 over a network 302. In one embodiment, the server computer systems 342 may be one or more computer hardware devices that are used to implement computer system instances 320. For example, the server computer systems 342 may include hardware for implementing different types of computing resources, such as storage devices, virtualized storage devices, networking devices, and the other computing resources suitable for supporting computer system instances 320 and services of the computing resource service provider 304 as described in greater detail below. Additionally, the implemented computing resources may be programmatically and remotely managed by the customer of the distributed computing resource provider by transmitting one or more requests 306 to the computing resource service provider 304.

The server computer systems 342 include a plurality of computer system devices that are each capable of executing one or more computer system instances 320 of a particular type created by the computing resource service provider 304. In one embodiment, each of the server computer systems 342 includes a processor, a data store, an input/output bus, and/or any other component suitable for executing computer system instances 320. Additionally, the computer system instances 320 may be virtual machine instances. A virtual machine instance is an instance of a software implementation executed on physical machine (e.g., a computer) that executes programs like a physical machine. For example, each of the server computer systems 342 may be configured to execute an instance manager 318 capable of implementing the computer system instance 320.

The instance manager 318 may be a hypervisor, virtualization layer, operating system, or another type of program that enables the execution of multiple computer system instances 320 on a single server computer system 342, for example. As discussed above, each of the computer system instances 320 may execute all or a portion of an application or a workload, such as a customer application or a service of the computing resource service provider 304. Additionally, the network 302 may be similar to the network as described above. The networked environment 300 may span one or more data centers, where each data center may be geographically distinct from each other. Additionally, the networked environment 300 shown in FIG. 3 may be one of several embodiments employed by the computing resource service provider.

In one embodiment, the computing resource service provider 304 includes a storage service 310 maintaining hibernation data 324, a compute service 312, a placement service 328, an auto-scaling service 330, a maintenance service 332, a metrics service 334, a load balancing service 336, a resiliency testing service 338, and/or other components or service. The hibernation data 324 may include data (e.g., state data, execution data, memory, ephemeral state, etc.) related to customer operated computer system instances 320, such that the hibernation data 324 may be used by an operating system and/or agent 322 of the computer system instances 320 to resume operation after a stop command and/or termination. For example, the hibernation data 324 includes a boot image of a particular computer system instance. As illustrated in FIG. 3, the hibernation data 324 is generated by an operating system 326 of the computer system instance 320. In yet other embodiments, the agent 322, instance manager 318, or other component of the computer system instance 320 or computing resource service provider 304 generates the hibernation data 324. The storage service 310 may include any number or type of storage devices that may be used to store data and/or expose storage location (e.g., logical volume and/or disk storage device exposed to a computer system instance). For example, the storage service 310 includes a set of physical storage devices exposed to the instances 320 as storage locations suitable for storing hibernation data 324, such as by exposing the physical storage devices as virtual hard drives.

As described above, the compute service 312 instantiates computer system instances 320 based at least in part on a set of requirements and/or constraints provided by the customer. Furthermore, the compute service 312 may include a set of server computer systems or other physical hardware including executable code or other logic that, when executed by the server computer systems 342, cause the server computer systems 342 to perform the operations of the compute service 312 as described in the present disclosure. In one embodiment, the compute service 312 receives, from the customer through the client device 308, a request 338 to create one or more computer system instances 320 and optionally assign a particular behavior to the one or more computer system instances. Additionally, the request 338 received from the customer through the client device 308 may also indicate additional information such as a time to start execution, a maximum cost, a type of computer system instance, or other information suitable for instantiating computer system instances 320.

In response to receiving the request, the compute service 312 instantiates computer system instances 320 according to the behavior indicated (e.g., stop or hibernate). Furthermore, as described above, the compute service 312 may create and/or update instance metadata to indicate the desired behavior. In various embodiments, the instance metadata is transmitted to the server computer system 342 and maintained by the server computer system 342 in a location within the service computer system 342 such that the computer system instances 320 executed by the server computer system 342 can access the instance metadata without making a network call. When various signals are received from the compute service 312 or other services of the computing resource service provider 304, the agent 322, instance manager 318, or other component of the computer system instance 320 may poll or otherwise obtain data from the instance metadata to determine a particular behavior to perform (e.g., hibernation).

The customer may interact with the computing resource service provider 304 (via appropriately configured and authenticated API calls) to provision, operate, and manage computer system instances 320 that are instantiated on server computer systems 342 operated by the computing resource service provider 304. Additionally, the customer may create one or more auto-scaling groups, and the auto-scaling groups may be a logical collection of computer system instances 320 configured to execute the customer workload or application managed by an auto-scale service 330. Furthermore, the computer system instances 320 may be assigned to the auto-scaling group or may be members of the auto-scaling group. The auto-scaling service 330 may allow customers to interact with and manage various auto-scaling groups. For example, the customer may, through the auto-scaling service 330, set a maximum or minimum capacity for an auto-scaling group. The auto-scaling group may then manage the computer system instances 320 assigned to the auto-scaling group in order to maintain the settings provided by the customer.

In various embodiments, the customer may create and manage instances through a management console provided by the computing resource service provider 304. The management console may be exposed to the customer as a webpage, and by interacting with the webpage (e.g., through a browser application), such as the webpage 200 described above, the customer may cause API calls to be generated. The generated API calls may cause the computing resource service provider 304 or component thereof to perform various operations indicated by the customer. The computer system instances 320 may be used for various purposes, such as to operate as servers supporting a website, to operate business applications or, generally, to serve as computing power for the customer. Other applications for the computer system instances 320 may be to support database applications, electronic commerce applications, business applications, and/or other applications. Although the compute service 312 is shown in FIG. 3, any other computer system or computer system service may be utilized by the computing resource service provider 304, such as a computer system or computer system service that does not employ virtualization or instantiation and instead provisions computing resources on dedicated or shared computers/servers and/or other physical devices.

The placement service 328 provisions the computer system instances 320 to one or more of the server computer systems 342. In one embodiment, the placement service 328 determines the server computer systems 342 to provision the new computer system instances 320 based at least in part on the indicated auto-scaling group of the new computer system instances 320. In another embodiment, the placement service 328 determines the server computers 342 to provision the new computer system instances 320 based at least in part on requirements and/or constraints provided by the customer as described above. For example, the placement service 328 may identify one or more server computer systems 342 with the appropriate capacity to execute the computer system instances 320.

The auto-scaling service 330 automatically scales the capacity of a collection of previously requested computer system instances 320 up or down based at least in part on circumstances defined by the customer that requested the computer system instances 320. For example, the auto-scaling service 330 may decrease the number of computer system instances 320 allocated to the customer during demand lulls and increase the number of computer system instances 320 allocated to the customer during demand peaks. In one embodiment, the auto-scaling service 330 hibernates a subset of the computer system instances 320 during a period of low usage and/or idle time. For example, the customer transmits a request to provision a computer system instance as a member of an auto-scaling group, in response to a customer request the auto-scale service 330 or other service of the computing resource service provider 304 causes the computer system instance to be hibernated and clones the hibernated instance. These cloned computer system instances enable the auto-scale service 330 to quickly and accurately scale up the auto-scaling group in response to a demand peak. Cloned computer system instances, in various embodiments, includes a copy of all data maintained in a logical volume associated with the computer system instance being cloned. For example, a cloned computer system instance includes a new computer system instance instantiated with a copy of a logical volume attached to a computer system instance being cloned. In other embodiments, the auto-scaling service 330 terminates a certain number of computer system instances 320 allocated to the customer such that the remaining number of computer system instances 320 allocated to the customer is not redundant and/or excessive. In these embodiments, the computer system instance 320 may be hibernated based at least in part on the behavior selected by the customer.

The maintenance service 332 schedules maintenance, rack replacement, rack retirement, rack consolidation, software updates, and/or firmware updates for the server computer systems 342. In one embodiment, the maintenance service 332 schedules the maintenance and/or software updates at an appropriate time based at least in part on the available capacity of the server computer systems 342. For example, the maintenance service 332 may schedule the maintenance and software updates at a time when the respective server computer 342 has a projected availability. In one embodiment, the maintenance service 332 may patch and restart the server computer systems 342 when the maintenance service 332 determines that the server computer system 342 is not hosting any computer system instances 320. Additionally, the maintenance service 332 may patch virtual machines associated with the instance 320 if necessary prior to instantiating new images that are associated with the respective virtual machines. For example, the maintenance service 332 may schedule a patch of the machine image based at least in part on the health status of the computer system instances 320. In one embodiment, no additional instances may be provisioned on the server computer system 342 until the scheduled maintenance is completed.

However, in some embodiments, the server computer systems 342 are required to be patched, replaced, repaired, and/or retired while still executing computer system instances 320. In such embodiments, the compute service 312 or other service of the computing resource service provider 304 may hibernate the computer system instances executed by the server computer system thereby generating hibernation data 324. The hibernation data 324 may then be used to restart the computer system instances 320 on a new server computer system 342 or after the server computer system 342 has been repaired and/or patched. In this manner, computer system instances may be migrated to new server computer systems 342 and/or interruptions causes by maintenance of the server computer systems 342 may be reduced.

In addition, the maintenance service 332 and/or resiliency testing service 338, as described in greater detail below, may be responsible for periodically or aperiodically causing computer system instances 320 to be hibernated to test customer applications executed by the computer system instances 320. The customer may opt-in or otherwise request this type of resiliency testing. The maintenance service 332 or other service of the computing resource service provider 304 may cause the customer's computer system instances 320 to be hibernated and restarted to test the computer system's instances 320 ability to restart correctly after hibernation. For example, after restart the computer system instance 320 may require certain operations to be performed to execute the customer's application correctly. The operations may include obtaining a network address, registering with a load balancer, registering with an auto-scaling group, or other operation of a distributed application. The hibernations and restarts may occur frequently during an initial phase but then may exponentially back-off (e.g., reduction in frequency). Any interval or set of intervals for causing hibernations of computer system instances may be used in connection with the embodiments described in the present disclosure.

The maintenance service 332 may also periodically or aperiodically check the health status of the computer system instances 320, including instances assigned to the auto-scaling group. The health check may include determining the load, utilization, and operation of various components of the computer system instances 320 such as the central processing unit, memory, networking interface, operating system, application, and other components of the computer system instances 320. In various embodiments, when the maintenance service 332 determines that a computer system instance 320 is unhealthy, based at least in part on the health check, the maintenance service 332 or other component of the service provider 304, such as the auto-scaling service 330, may initiate a workflow to terminate the unhealthy computer system instance. As described above, if the instance metadata or other information indicates that the computer system instance is a hibernation instance, the agent 322 or other component illustrated in FIG. 3 may cause hibernation data 324 to be stored by the storage service 310 prior to termination of the computer system instance 320.

The metrics service 334 may be responsible for collecting instance data and/or customer workload data corresponding to the computer system instances 320. The instance data obtained by the metrics service 334 may indicate the utilization of various components of the computer system instances 320 such as the central processing unit, memory, networking interface, operating system, applications, and other components of the computer system instances 320. Additionally, the information may be used by the maintenance service 332 to determine the health of a computer system instance 320 and/or a server computer 342. The metrics service 334 may obtain and aggregate utilization information for all of the computer system instances 320 executing customer workloads or applications.

The load balancing service 336 may be offered to customers of a computing resource service provider 304 in order to facilitate request processing by computer system instances 320. In various embodiments, the computer system instances 320 may be assigned to an auto-scaling group and the load-balancing service 336 may distribute traffic to the computer system instances 320 assigned to the auto-scaling group. For example, the customer may operate a website using computer system instances 320 assigned to the auto-scaling group using the resources of a computing resource service provider 304. Additionally, the website may receive requests from multiple other customers over the network 302. The computing resource service provider 304 may cause a load balancer of the load balancing service 336 to direct the requests to the computer system instances 320 of the auto-scaling group executing the website in such a way that the load generated by processing the requests is distributed among the computer system instances 320 of the auto-scaling group executing the website.

The load balancing service 336 may be a computer system or virtual computer system including computing resources that distribute the request to the computer system instances 320 assigned to a load balancer in order to optimize resource utilization and/or avoid overloading a particular server computer 342. For example, the load balancer may include physical hardware connected to a server rack or otherwise included in a data center. In another example, the load balancer may include one or more virtual machines supported by a server computer 342. In various embodiments, the load balancer may obtain instance data and/or customer workload data and distribute traffic to the computer system instances 320 based at least in part on the obtained instance data and/or customer workload data. For example, the load balancing service 336 may distribute traffic based at least in part on a capacity of a particular computer system instance indicated in the instance data.

The resiliency testing service 338 may be a computer system or virtual computer system including computing resources that causes a signal to be transmitted to a particular instance or particular server computer system supporting the particular instance to hibernate the particular instance. For example, the signal includes a stop signal as described in the present disclosure. In various embodiments, the customer may request or otherwise opt-in to resiliency testing of an application executed by a set of instances 320. The resiliency testing performed by the resiliency testing service 338 may enable the determination that a particular application can be restarted from hibernation without failure. For example, a particular application needs to register a network address with a particular server computer system for execution of the particular application by a set of instances 320. When a particular instance is hibernated and restarted the particular instance may obtain a new network address. Returning to the example above, in these situations the particular application may require the new network address to be registered in order for the particular application to function correctly.

The resiliency testing service 338 enables customers to test for such error by periodically or aperiodically causing instances 320 to be hibernated to test the instances' response to hibernation. In addition, the resiliency testing service 338, in various embodiments, detects the success and/or failure of the instances 320 to restart from hibernation. Furthermore, if the resiliency testing service 338 determines that the number of instances 320 that fail to successfully return from hibernation and/or operate successfully after returning from hibernation (e.g., the instance continues to operate as expected by the application without errors) reaches a value relative to a threshold value, then the resiliency testing service 338 may determine a back-off rate. The back-off rate indicates an interval of time during with no additional resiliency testing will occur. Similar to failures, if the resiliency testing service 338 determines that the instances 320 successfully restart from hibernation, subsequently resumes execution of the application without error, the resiliency testing service 338 may determine a back-off rate and/or terminate resiliency testing. Furthermore, the duration and/or rate of testing may be modified by the customer.

Figure 4:
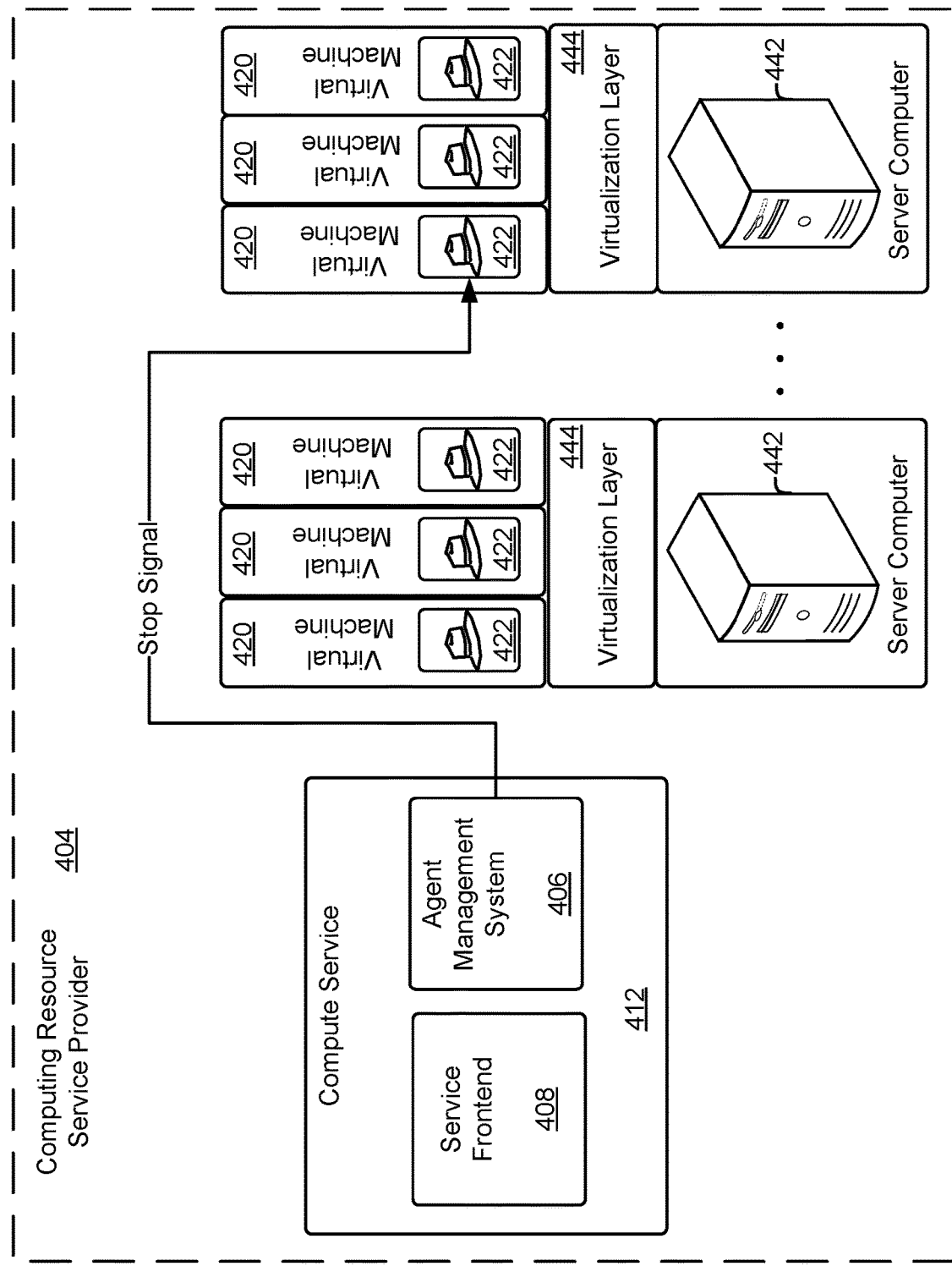
FIG. 4 illustrates an environment in which an agent executed by a computer system instance may receive a stop signal associated with the computer system instance in accordance with an embodiment.

FIG. 4 illustrates an environment 400 in which a compute service 412 of a computing resource service provider 404 may transmit a stop signal to an agent 422 executed by a computer system instance in accordance with at least one embodiment. The compute service 412, which may be implemented by physical hardware, is used by the computing resource service provider 404 to provide computing resources such as virtual machine instances 420 to customers and/or other services of the computing resource service provider 404. The compute service 412 may include a group of computing systems such as the server computer systems 442 that provision computing resources as described above. The compute service 412, as illustrate in FIG. 4, also includes a service frontend 408 and an agent management system 406. The service frontend 408, as described in greater detail below, may receive requests from customers and transmit information, such as responses to customers. The agent management system 406 may instantiate, manage, and/or communicate with the agents 422. The agents 422 may be an application or other executable instructions executed by the virtual machine instances 420 as described above.

The physical hardware may include a server computer system 442 as described above in FIG. 3. In addition, a virtualization layer 444 may include a process or application executed by the server computer system 442 that provides the computer system instances (e.g., virtual machine instances 420) with access to the physical resources of the service computer system 442 as described above in connection with FIG. 3. Commands and other information may be included in an API call from the compute service 412 or the agent management system 406, described in greater detail below, to the virtualization layer 444. The compute service 412 enables the customers and other services of the computing resource service provider 404 to manage particular behaviors of the virtual machines 420 managed by the agents 422. For example, the customer transmits a request to a service frontend 408 to set the behavior of a particular virtual machine to hibernation. In one embodiment, in response to the request, the compute service 412 causes the agent 422 to be executed by the particular virtual machine to perform hibernation operations in response to a stop signal. Other behaviors, such as the stop behavior, may also be specified and performed in accordance with FIG. 4. In such embodiments, the agent 422 may be excluded or otherwise not executed by the virtual machine instance 420. In addition, in response to a stop signal the virtual machine instance 420 is terminated but the attached logical volume is maintained as described above.

The stop signal, in an embodiment, indicates an interval of time during which the virtual machine may be terminated. In another embodiment, the stop signal indicates a point in time after which the virtual machine will be terminated. For example, the stop signal indicates to the agent that the virtual machine instance 420 will be terminated after two minutes. The stop signal may include a variety of information suitable for enabling the agent to initiate hibernation operations of the virtual machine instance 420. In addition, the stop signal may be a service call, data packets, or any other suitable mechanism for transmitting information. In various embodiments, the agents 422 are continuously monitoring for stop signals directed to the virtual machine instances 420. In such embodiments, the agents 422 may poll a location maintained by the server computer systems 442 and designated to store instance metadata as described above. In other embodiments, the stop signal is communicated directly to the agent 422. In various embodiments, the virtualization layer 444 or other components illustrated in FIG. 4, such as the agent management system, determines if the virtual machine instance instance 420 has completed hibernation operations in response to the stop signal prior to terminating the virtual machine instance 420. For example, monitoring the input/output operations of the virtual machine instance 420 may indicate if the virtual machine instance 420 has completed hibernation operations based at least in part on the activity of the input/output operations.

Figure 5:
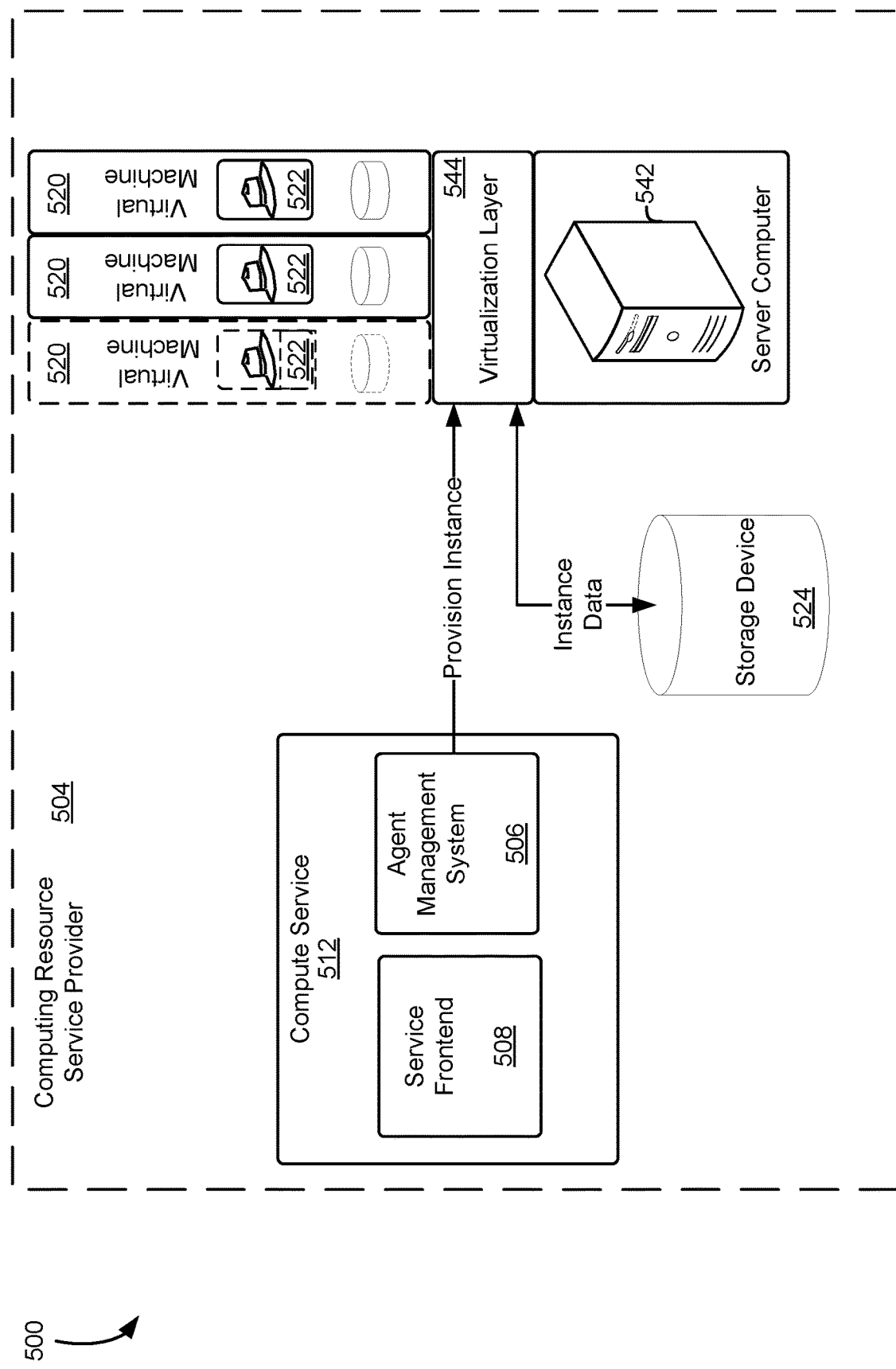
FIG. 5 illustrates an environment in which an agent executed by a computer system instance may receive a start signal associated with the computer system instance in accordance with an embodiment.

FIG. 5 illustrates an environment 500 in which a compute service 512 of a computing resource service provider 504 may transmit a start signal to an agent 522 executed by a computer system instance in accordance with at least one embodiment. The compute service 512, which may be implemented by physical hardware, is used by the computing resource service provider 504 as described above. The compute service 512, as illustrated in FIG. 5, also includes a service frontend 508 and an agent management system 506 as described in greater detail above in connection with FIG. 4. The physical hardware may include a server computer system 542 as described above in FIG. 3. In addition, a virtualization layer 544 may include a process or application executed by the server computer system 542 that provides the computer system instances (e.g., virtual machine instances 520) with access to the physical resources of the server computer system 542 as described above in connection with FIG. 3.

As illustrated in FIG. 5, the agent management system 506 transmits a command to provision the virtual machine instance 520 to the virtualization layer 544. In various embodiments, the command to provision the virtual machine instance 520 is transmitted directly to the server computer system 542 or other component of the server computer system 542 such as the virtualization layer 544. The hypervisor may expose to the virtual machine instances 520 a logical volume implemented by the data storage service (not shown in FIG. 5 for simplicity). As described above, the logical volume may include hibernation data which enables the virtual machine to resume executional state prior to a hibernation event and/or hibernation request. In various embodiments, an operating system executed by the virtual machine instance 520 manages boot operations of the virtual machine to load hibernation data into memory or otherwise resume the previous executional state. The virtual machine instances 520 may be provided hibernated instances from a storage service as described above. The hibernated instance may include logical volumes including hibernation data, such as a boot volume from a hibernated computer system instance as described above.

For example, both Linux (RTM) and Windows (RTM) operating systems include a flag on a boot volume that allows the operating system during boot operations to determine based at least in part on the flag that the boot operations are to restore from hibernation rather than a clean boot (e.g., a boot that does not restore hibernation data). The operating system, after executing and/or loading at least a portion of the operating system that is not subject to hibernation, obtains state information (e.g., hibernation data) from the logical volume and loads the state information into memory of the virtual machine instance 520, thereby causing applications executed by the virtual machine instance 520 to resume execution. As illustrated in FIG. 5, the virtual machine instance 520 restarting from hibernation is shown with dashed lines. The virtualization layer 544, in various embodiments, is responsible for receiving the command to provision the instance and obtain the instance data from a storage device 524 as described above.

In various embodiments, the agent 522 is not involved in resuming the virtual machine. However, the agent 522 may include executable code to detect that the agent 522 has been resumed from a hibernated computer system instance and perform various operations as described in the present disclosure. For example, the agent 522 may resume polling the instance metadata to determine the behavior of the virtual machine instance 520 and/or any stop and/or hibernation operations that are to be executed. In another example, the agent 522 may validate that the hibernation operations executed correctly. In yet other embodiments, the agent 522 is responsible for loading hibernation data into memory of the virtual machine instance 520.

Figure 6:
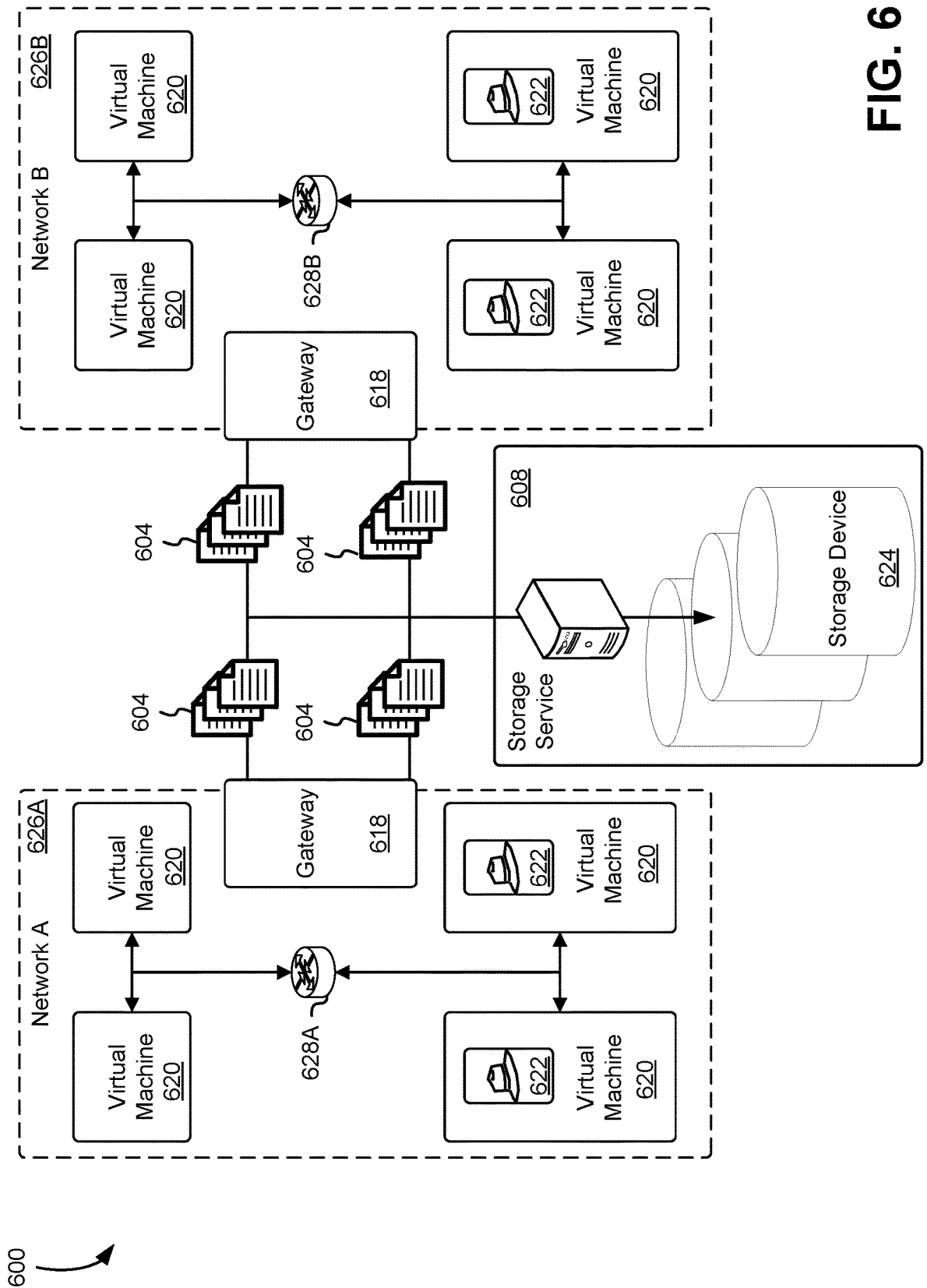
FIG. 6 illustrates an environment in which a computer system instance may communicate with a storage service to send and receive hibernation data in accordance with an embodiment.

FIG. 6 illustrates an aspect of an environment 600 in which an embodiment may be practiced. Specifically, FIG. 6 depicts the collection, processing, and storage of hibernation data 604 generated by virtual machines 620 or components thereof such as an operating system and/or agents 622. The environment 600 may include a storage service 608 that exposes logical volumes to computing resources executed by servers in the sets of racks. For example, a virtualization layer executing on the server computer in the sets of racks enables the physical hardware of the services to be used to provide computational resources, including logical storage volumes, upon which one or more virtual machines 620 or other computing resources may operate. The virtualization layer enables the virtual machines 620 to access physical hardware on the server computer through virtual device drivers or other executable code on the virtual machine 620. The virtual machines 620 may include any number of computer systems and applications executed by customers of the computing resource service provider. For example, the virtual machine 620 includes an operating system, an agent 622, and other applications operated by the customer. The logical volume may be exposed by the storage service 608 and may include network attached storage devices in a set of racks operated by the storage service 608. In yet other embodiments, the storage service 608 provides on-demand storage for the virtual machines 620.

The computer system instances (e.g., virtual machines 620) may be placed on the servers according to a rack diversity constraint where the sets of racks may be localized by different networks 626A-626B. The hibernation data 604 may include information as described above; the information may be obtained from different agents 622 executed by the servers in the sets of racks. Furthermore, the storage service 610 may include computer systems that the process the hibernation data 604 and store the hibernation data as hibernated instances in one or more storage devices 624 as described in greater detail above. The sets of racks may be physical hardware (e.g., server computers as described above) hosting one or more servers, or in some embodiments may simply be logical groupings of the one or more servers. Examples of logical groupings other than by rack may include servers grouped together based on data center location, servers in different fault isolation groups (i.e., logical divisions of resources such that failure of one fault zone may not affect servers in the other zones; e.g., grouped by geographic regions, data centers, hard drive clusters, backup generators, etc.), servers grouped together based on performance characteristics (e.g., throughput, input/output operations per second, etc.), and so on. The servers in a rack may be members of a particular network. In some implementations, multiple racks of servers may be members of the same network. Additionally, the set of racks may be a "brick server" or other server that is a compact computer server module without a chassis that may include various processors, RAM, I/O, and storage configurations and may be designed to fit into various rack locations. The set of racks may also be connected by a top of rack switch.

The networks 626A-626B may be data communication pathways between one or more electronic devices. The networks 626A-626B may be wired or wireless networks and may use any of a variety of communications protocols for organizing their network traffic. The networks 626A-626B may allow the sharing of files, data, and other types of information between the one or more electronic devices accessible through the data communication pathways. For example, the hibernation data 604 is transmitted over the networks 626A-626B to the storage service 610 to be stored as hibernated instances 624 in one or more storage devices 624. Each of the networks 626A-626B may be associated with a router, such as an aggregation router that aggregates the servers of the respective set of racks into the common network, separate from the router associated with the other network. Each of the networks 626A 626B may be on a different subnet than the other network. For example, as illustrated in FIG. 6, the servers of the set of racks may be commonly connected to a router 628A. Similarly, the servers of the set of racks may be commonly connected to a router 628B. The routers 628A-628B may be networking devices that forward packets between computer networks, such as between the networks 626A-626B.

The environment 600 may also include a gateway 618 that receives network traffic directed to computing systems and/or computing resources, such as virtual machines 620, executed by servers in the sets of racks and enables interfacing with another network, such as the Internet, that may use different protocols. The gateway 618 may contain computing devices such as protocol translators, impedance matching devices, rate converters, fault isolators, or signal translators as necessary to provide system interoperability, such as preforming protocol conversion to enable computing devices to communicate between networks.

The agent 622, as illustrated in FIG. 6, may include executable code that provides management of various hibernation operations. The agent 622 may be a process or application executed by the virtual machine 620. The agent 622, in an embodiment, manages migration of a virtual machine 620 to a different rack by at least causing hibernation data 604 to be generated and stored as a hibernated instance 624 and then causing the hibernated instance 624 to be restarted on a different rack. The agent 622 may execute one or more "hooks" in a kernel of an operating system of the virtual machines 620. For example the agent 622 may execute a hook that intercepts messages generated by the operating system when executing hibernation of the virtual machine 620. As another example, the agent 622 may execute a hook that intercepts messages such as stop signals or start signals as described above.

The executable code that handles such intercepted function calls, events, or messages may be referred to in the context of the present disclosure as a "hook." Executing a hook by the agent 622 or other entity as described in the present disclosure covers a range of techniques which may be used to alter or augment the behavior of an operating system, applications, or of other executable code by at least intercepting function calls, messages, or events passed between applications, including the operating system and virtualization layer of the service computer system. The agent 622 may perform various operations as described in the present disclosure in response to various hooks executed by the agent 622. For example, the agent 622 may detect an update to the instance metadata based at least in part on a particular hook and, as a result, cause the virtual machine 620 or component thereof to generate hibernation data 604. As illustrated in FIG. 6, the agent 622 may be executed by a portion of the virtual machines 620. For example, only a portion of the customers of the computing resource service provider may wish to have the agent 622 installed and executed by virtual machines 620 operated by the customer.

Figure 7:
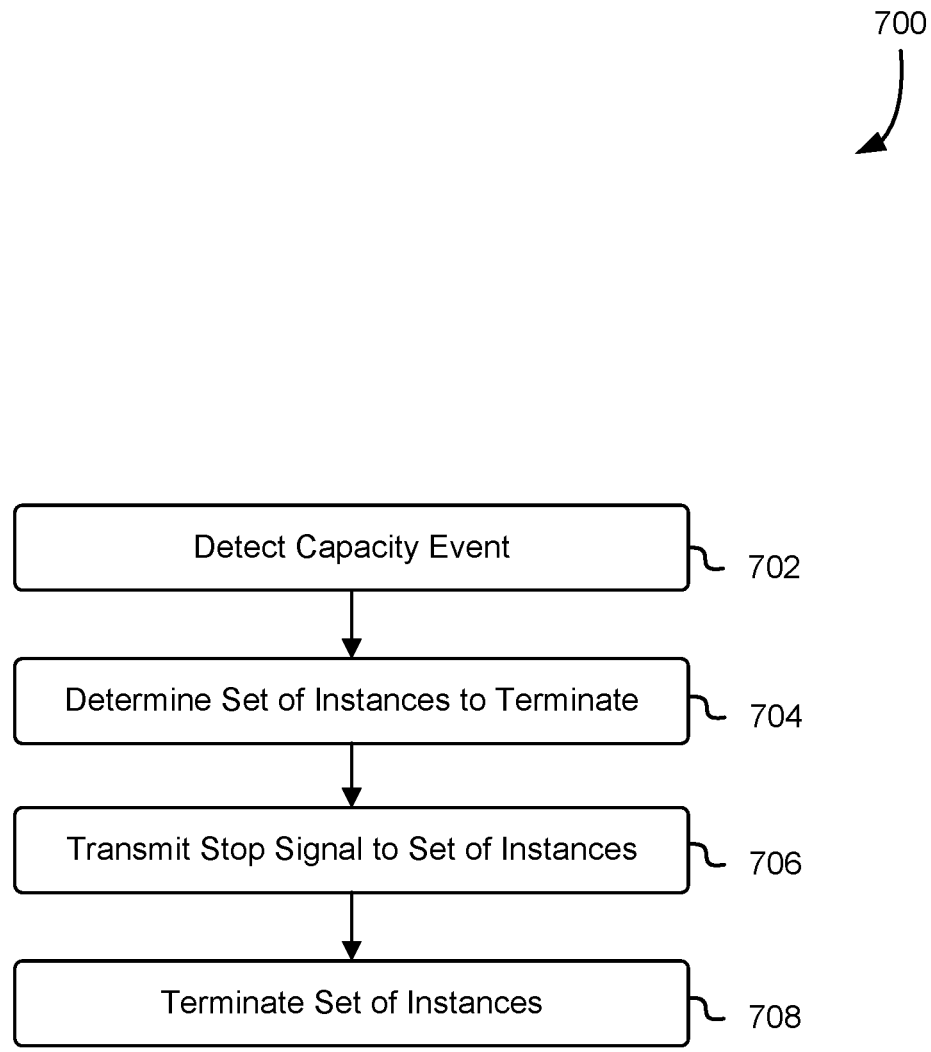
FIG. 7 is a block diagram illustrating a process for transmitting a signal to a set of computer system instances in accordance with an embodiment.

FIG. 7 is a block diagram illustrating an example of a process 700 for terminating a set of computer system instances in response to a capacity event in accordance with at least one embodiment. Some or all of the process 700 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 700 may be performed by any suitable system, such as a server in a data center, by various components of the environment 300 described in conjunction with FIG. 3, such as the compute service 312, by multiple computing devices in a distributed system of a computing resource service provider, or by a service provided by a computing resource service provider. The process 700 includes a series of operations where a set of instances are terminated in response to an event, such as a capacity event, power event, maintenance event, or any other event affecting service computer systems. For example, the process 700 includes detecting an event 702. In one example, the event includes a capacity event which is any event or condition as described above that requires the modification of a set of computer system instances executed by one or more server computer systems. For example, a capacity event includes the demand for computer system instances exceeding the current capacity within a data center, geographic location, or logical grouping of sever computer systems. In another example, a capacity event includes maintenance of a server computer system requiring the termination of a set of computer system instances executed by the server computer system to complete the maintenance.

Once the event has been detected, the system executing the process 700 may then determine a set of computer system instances to terminate 704. For example, a particular customer defines a cost constraint indicating a maximum price the customer is willing to pay to run the instance or that when the cost of executing a particular computer system instance exceeds a threshold, the particular computer system instance is to be terminated. In another example, the compute service determines a set of instances to terminate based at least in part on an amount of available capacity and capacity requirements of computer system instances being executed. Any mechanism for determining a computer system instance to terminate in response to a capacity event is considered within the scope of the present disclosure.

Once the compute service has determined the set of instances to terminate, the compute service may transmit a stop signal to the set of instances 706. As described above, the stop signal may indicate to the set the of computer instances an interval of time after which the set of computer system instance may be terminated. The stop signal may include various signals as described above and may be directed towards various endpoints as described above. For example, the stop signal is an update to metadata associated with a computer system instance maintained by a sever computer system supporting the execution of the computer system instance. In another example, the stop signal in a service call to a computer system instance. Any mechanisms for communicating information to the computer system instance, server computer system, or agent is considered within the scope of the present disclosure.

At a point in time after transmitting the stop signal, the compute service may terminate the set of computer system instances 708. Terminating the set of computer system instances may include transmitting a command to a virtualization layer or other component of a server computer system executing at least one computer system instance of the set of computer system instances. Note that one or more of the operations performed in 702-708 may be performed in various orders and combinations, including in parallel. For example, the system executing the process 700 may detect the capacity event in parallel with determining the set of computer system instances to terminate. In numerous variations to the process 700, one or more of the operations 702-708 may be omitted or performed by other systems of services.

Figure 8:
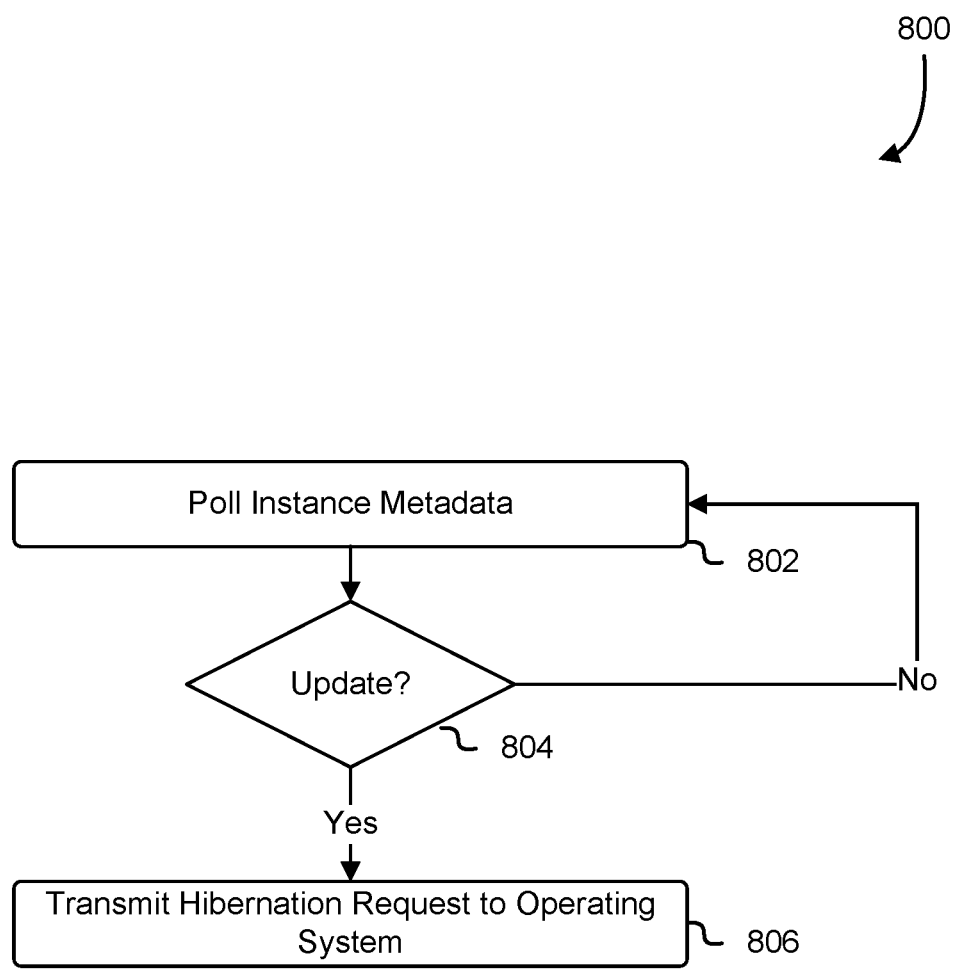
FIG. 8 is a block diagram illustrating a process for hibernating a computer system instance in accordance with an embodiment.

FIG. 8 is a block diagram illustrating an example of a process 800 for performing hibernation operations in accordance with at least one embodiment. Some or all of the process 800 (or any other processes described, or variations and/or combinations of those processes) may be performed under the control of one or more computer systems, including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 800 may be performed by any suitable system such as a server in a data center, by various components of the environment 300 described in conjunction with FIG. 3 such as the agent 322, by multiple computing devices in a distributed system of a computing resource service provider, or by a service provided by a computing resource service provider. For example, the process 800 includes polling instance metadata 802. As described above, the server computer system supporting execution of a computer system instance may maintain metadata associated with the computer system instance. In yet other embodiments, a compute service, as described above, may maintain the instance metadata. In such embodiments, the agent may poll the compute service or other location to obtain the instance metadata and/or any updates to the instance metadata.

The agent may then determine if there is an update to the instance metadata 804. An update may include any change or modification to the instance metadata. For example, the instance metadata may be modified in response to a stop signal indicating that the computer system instance associated with the instance metadata is to be terminated after the expiration of five minutes. If there is no update to the instance metadata, the agent may return to step 802 and continue to poll the instance metadata. In various embodiments, the agent periodically or aperiodically polls the instance metadata to detect updates. If the agent detects an update to the instance metadata, the agent may then transmit a hibernation request to an operation system of the computer system instance 806. As described above, the operating system of the computer system instance may support hibernation and may initiate hibernation operations in response to a service call such as an API call. Note that one or more of the operations performed in 802-806 may be performed in various orders and combinations, including in parallel. In addition, in numerous variations to the process 800, one or more of the operations 802-806 may be omitted or performed by other systems of services. For example, the agent may not pool the instance metadata; instead, the agent may receive an update whenever the instance metadata is modified. In numerous variations to the process 800, the agent receives a notification indicating an update to the instance metadata or other information that the computer system instance will be terminated. For example, an instance metadata service transmits a push notification to the agent including the update to instance metadata.

Figure 9:
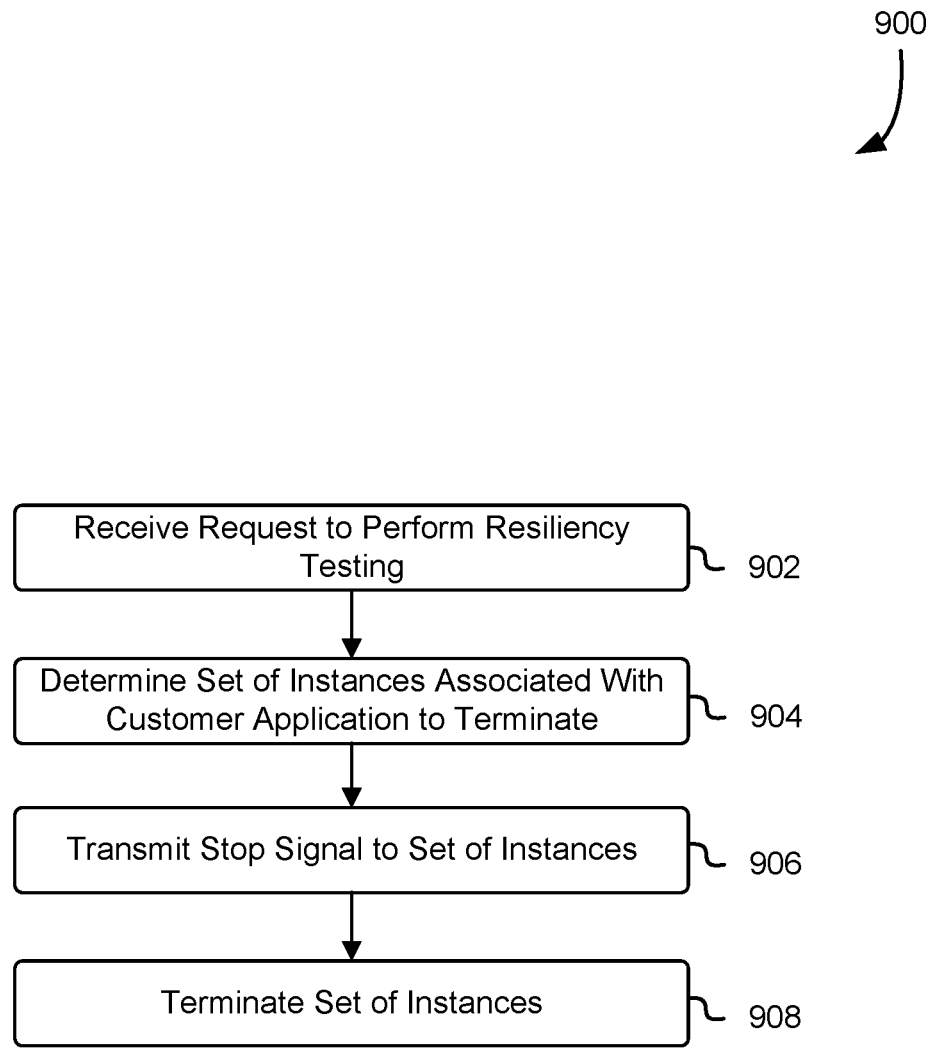
FIG. 9 is a block diagram illustrating a process for performing resiliency testing of a set computer system instances executing an application in accordance with an embodiment.

FIG. 9 is a block diagram illustrating an example of a process 900 for performing resiliency testing of a set computer system instance executing an application in accordance with at least one embodiment. Some or all of the process 900 (or any other processes described, or variations and/or combinations of those processes) may be performed under the control of one or more computer systems including executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 900 may be performed by any suitable system, such as a server in a data center, by various components of the environment 300 described in conjunction with FIG. 3, such as the resiliency testing service 338, by multiple computing devices in a distributed system of a computing resource service provider, or by a service provided by a computing resource service provider. The process 900 includes a series of operations where resiliency testing of an application is performed. For example, the process 900 includes receiving a request to perform resiliency testing 902. The request may be received as an API call or through a management console provided to a customer as a webpage. The request may indicate an application or set of instances to be tested.

Once the request is received, the system executing the process 900 may then determine a set of computer system instances to associate with the customer application to terminate 904. For example, a particular customer defines a set of computer system instances to execute a particular customer application. In yet other embodiments, the customer tags or generates metadata associated with the set of computer system instances indicating instances to be included in resiliency testing. Any mechanism for determining a computer system instance to terminate in response to a request to resiliency test a set of instances and/or and application is considered within the scope of the present disclosure.

Once the resiliency testing service has determined the set of instances to terminate, the resiliency testing service may transmit a stop signal to the set of instances 906. As described above, the stop signal may indicate to the set of computer instances an interval of time after which the set of computer system instances may be terminated. The stop signal may include various signals as described above and may be directed toward various endpoints as described above. For example, the stop signal is an update to metadata associated with a computer system instance maintained by a sever computer system supporting the execution of the computer system instance. In another example, the stop signal is a service call to a computer system instance. Any mechanisms for communicating information to the computer system instance, server computer system, or agent are considered within the scope of the present disclosure.

At a point in time after transmitting the stop signal, the compute service may terminate the set of computer system instances 908. Terminating the set of computer system instances may include transmitting a command to a virtualization layer or other component of a server computer system executing at least one computer system instance of the set of computer system instances. Note that one or more of the operations performed in 902-908 may be performed in various orders and combinations, including in parallel.

Figure 10:
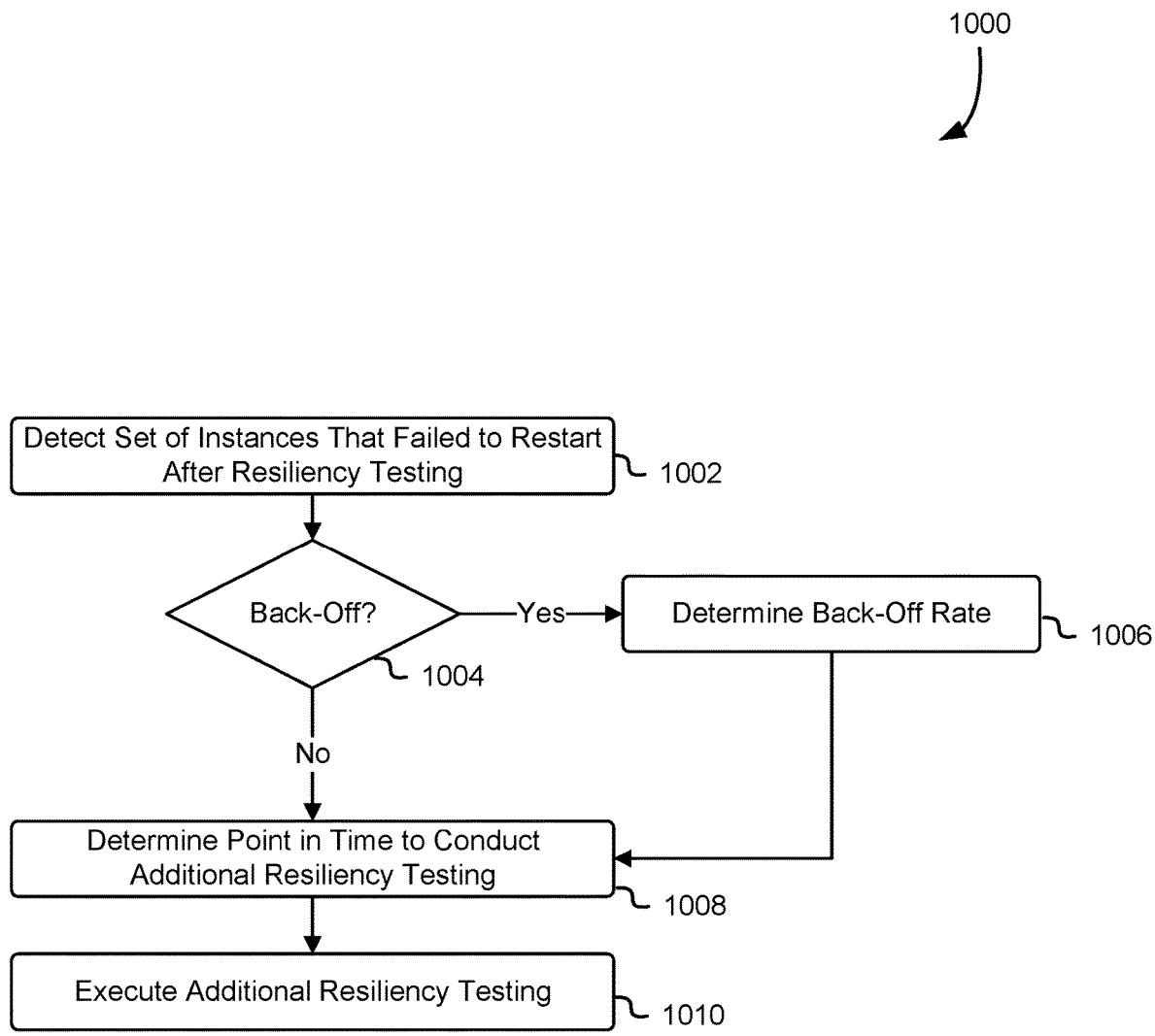
FIG. 10 is a block diagram illustrating a process for determining a back-off for resiliency testing of a set computer system instances executing an application in accordance with an embodiment.

FIG. 10 is a block diagram illustrating an example of a process 1000 for determining a back-off rate when performing resiliency testing of a set computer system instance executing an application in accordance with at least one embodiment. Some or all of the process 1000 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 1000 may be performed by any suitable system, such as a server in a data center, by various components of the environment 300 described in conjunction with FIG. 3, such as the resiliency testing service 338, by multiple computing devices in a distributed system of a computing resource service provider, or by a service provided by a computing resource service provider. The process 1000 includes a series of operations where a back-off rate for resiliency testing of an application is determined. For example, the process 1000 includes detecting a set of instances that have to operate as expected after restart from hibernation during resiliency testing 1002. As described above, computer system instances during resiliency testing may be hibernated and terminated. In addition, the hibernated computer system instances may be restarted and may resume execution of an application previously being executed before hibernation.

In various embodiments, the resiliency testing service determines if the computer system instances resumed execution of the application as expected (e.g., the restart after hibernation completed successfully and/or execution of the application resumed without error). The resiliency testing service may detect this based at least in part on information obtained from a variety of systems or services. For example, the resiliency testing service 338 obtains the information from a metrics service as described above. In another example, the resiliency testing service 338 obtains the information from a customer input received through a management console presented to the customer as a webpage. In addition, the information may be obtained from the instances directly. For example, the instance may include an application or other executable code that, after the instance is restarted from hibernation, transmits a notification to the resiliency testing service that the instances have restarted successfully from hibernation.

Once the resiliency testing service has determined the set of failed instances, the resiliency testing service may then determine if a back-off rate and/or interval should be implemented 1004. In various embodiments, if the number of failed instances is within a value relative to a threshold, then a back-off may be applied. If the resiliency testing service determines to apply a back-off, then the resiliency testing service 338 may determine a back-off rate 1006. As discussed above, the back-off rate may include an amount to increase the interval of time before executing additional resiliency testing. For example, an exponential back-off rate may be applied; the exponential back-off rate causes a delay of x amount of time upon the first determination to implement a back-off and a delay of 2× amount of time upon the second determination. This may continue until a maximum back-off value is reached or until some value is reached and resiliency testing is terminated.

Once the back-off is determined, the process 1000 may continue and the system executing the process 1000 may determine a point in time to conduct additional resiliency testing based, at least in part, on the back-off rate 1008. Similarly, if no back-off is implemented, the system executing the process 1000 may simply determine a point in time to conduct additional resiliency testing. In various embodiments, the customer and/or the resiliency testing service defines a rate of resiliency testing. For example, the customer may want their application initially to be tested frequently but after an interval of time or after a certain number of software revisions, the customer may want fewer tests performed to avoid interruptions in the execution of the customer's application. At this point in time or thereafter, the resiliency testing service may execute additional resiliency testing 1010. The resiliency testing may be performed as described above. Note that one or more of the operations performed in 902-908 may be performed in various orders and combinations, including in parallel. In addition, some of the operations performed in 902-908 may be omitted.

Figure 11:
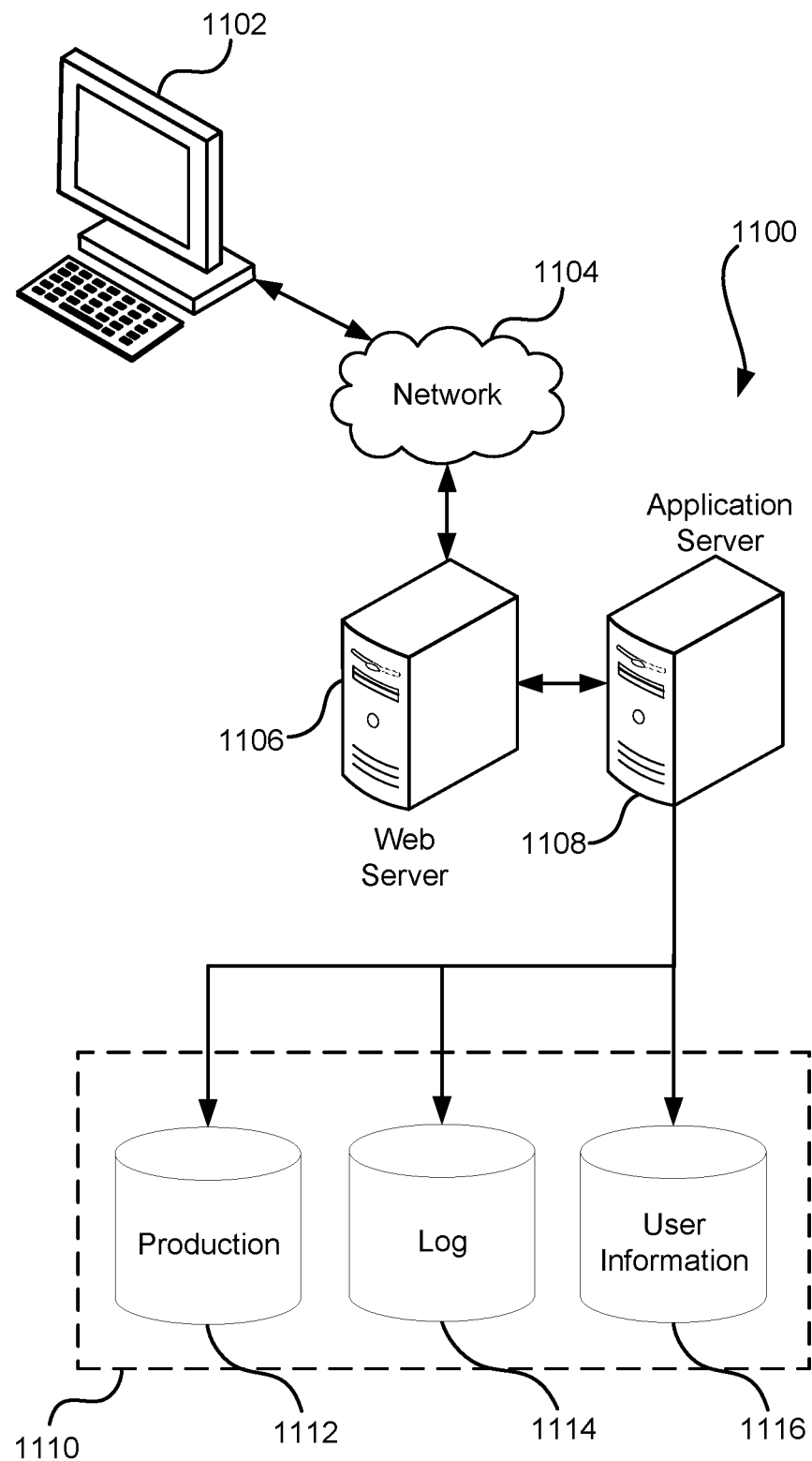
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages, or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail.

Communication over the network can be enabled by wired or wireless connections and combinations thereof. In this example, the network includes the Internet and/or other publicly addressable communications network, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage device, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("C S S"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1102 and the application server 1108, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes, and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. The application server 1108 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving a request to perform resiliency testing on an instance that is capable of hibernation;
instantiating the instance using a set of computing resources provided by a computing resource service provider;
causing the instance to execute an agent to manage hibernation of the instance; and
as a result of the agent detecting an occurrence of a stop signal:
determining, by the agent, to terminate the instance within a specified interval of time;
causing, by transmitting an update to an instance metadata service that is accessible to the instance, the agent to detect the update and consequently store hibernation data to a logical volume associated with the instance, the hibernation data including state information of the instance; and
terminating, by the agent, the instance within the specified interval of time; and
as a result of determining that the instance has failed to successfully resume from hibernation after terminating the instance, determining whether to back-off the rate of performing additional resiliency testing.

2. The computer-implemented method of claim 1, wherein the computer-implemented method further comprises causing the instance to be restarted based at least in part on a logical volume associated with the instance and the hibernation data.

3. The computer-implemented method of claim 1, wherein determining to terminate the instance further comprises determining to terminate the instance based at least in part on resiliency testing being performed on the instance.

4. The computer-implemented method of claim 1, wherein the stop signal comprises at least one of a capacity event, power event, or maintenance event.

5. The computer-implemented method of claim 1, wherein determining whether to back off the rate includes determining to exponentially reduce an initial rate of the resiliency testing.

6. A system, comprising:
one or more processors; and
memory to store computer-executable instructions that, if executed, cause the one or more processors to:
receive a request to perform resiliency testing on a computer system instance;
cause the computer system instance to be provisioned to use a set of computer resources provided by a computing resource service provider, the computer system instance executing an agent that monitors instance metadata associated with the computer system instance and the computer system instance having access to a storage location supported at least in part by a storage service of the computing resource service provider, wherein the agent, as a result of receiving a service event indicative of insufficient computer resources, determines to terminate the computer system instance;
cause, by transmitting an update to instance metadata associated with the computer system instance, the agent to detect the update and transmit a command to an operating system of the computer system instance to execute a hibernation operation, the hibernation operation causing hibernation data to be stored in the storage location, and
as a result of determining that the computer system instance fails to successfully resume operation from hibernation after terminating the computer system instance, determining whether to back-off the rate of performing additional resiliency testing.

7. The system of claim 6, wherein the update is generated based at least in part on a determination by the computing resource service provider to terminate the computer system instance.

8. The system of claim 7, wherein the memory further includes computer-executable instructions that, if executed, cause the one or more processors to determine to terminate the computer system instance based at least in part on a price associated with execution of computer system instances.

9. The system of claim 6, wherein the update is generated based at least in part on a determination to terminate the computer system instance based at least in part on a determination to perform maintenance on the set of computer resources hosting the computer system instance.

10. The system of claim 6, wherein the memory further includes computer-executable instructions that, if executed, cause the one or more processors to generate a set of cloned storage locations, generated by at least copying the storage location including the hibernation data to a set of additional storage locations.

11. The system of claim 6, wherein the memory further includes computer-executable instructions that, if executed, cause the one or more processors to receive a request to enable hibernation behavior for the computer system instance.

12. The system of claim 6, wherein the memory further includes computer-executable instructions that, if executed, cause the one or more processors to cause the hibernation data generated as a result of the hibernation operation to be stored in a logical volume associated with the storage location.

13. The system of claim 12, wherein the memory further includes computer-executable instructions that, if executed, cause the one or more processors to transmit a request to a second set of computer resources distinct from the set of computer resources to instantiate the computer system instance such that the second set of computer resources causes the logical volume to be attached to the computer system instance to resume a saved state of the computer system instance.

14. A non-transitory computer-readable storage medium having stored thereon executable instructions that, as a result of being executed by one or more processors of a computer system, cause the computer system to at least:
perform resiliency testing against a virtual machine instance including a logical volume accessible to the virtual machine instance; and
launch an agent on the virtual machine instance, wherein the agent:
detects an occurrence of a service event that affects the virtual machine instance, the service event indicative of insufficient computer resources;
determines to terminate the virtual machine instance;
causes, based at least in part on metadata indicating to hibernate the virtual machine instance, an operating system executing in the virtual machine instance to generate hibernation data and store the hibernation data in the logical volume; and terminates the virtual machine instance, as a result of determining that the computer system instance fails to successfully resume operation from hibernation after terminating the computer system instance, determining whether to back-off the rate of performing additional resiliency testing.

15. The non-transitory computer-readable storage medium of claim 14, wherein the instructions that cause hibernation data to be generated further comprise instructions that, as a result of being executed by the one or more processors, cause the computer system to send a signal to an agent running in the virtual machine instance, wherein the agent is configured to prepare the logical volume to store state information associated with the virtual machine instance.

16. The non-transitory computer-readable storage medium of claim 15, wherein the instructions that cause the computer system to cause hibernation data generated by the virtual machine instance to be stored in the logical volume further include instructions that cause the computer system to store the state information associated with the virtual machine instance in the logical volume.

17. The non-transitory computer-readable storage medium of claim 16, wherein the instructions further comprise instructions that, as a result of being executed by the one or more processors, cause the computer system to:

receive a request to restart the virtual machine instance; and restart the virtual machine instance by at least attaching the logical volume to the virtual machine instance such that state information can be obtained from the logical volume.

18. The non-transitory computer-readable storage medium of claim 17, wherein the instructions that cause the computer system to attach the logical volume to the virtual machine instance further include instructions that cause the computer system to load the state information associated with the virtual machine instance into memory of the virtual machine instance.

19. The non-transitory computer-readable storage medium of claim 18, wherein the instructions further comprise instructions that, as a result of being executed by the one or more processors, cause the computer system to:

determine that the state information associated with the virtual machine instance has failed to be loaded memory of the virtual machine instance; and transmit a notification to a customer associated with the virtual machine instance.

20. The non-transitory computer-readable storage medium of claim 14, wherein the instructions that cause the computer system to detect the service event further include instructions that cause the computer system to detect the service event based at least in part on resiliency testing being performed on the virtual machine instance.

21. The non-transitory computer-readable storage medium of claim 14, wherein the instructions further comprise instructions that, as a result of being executed by the one or more processors, cause the computer system to transmit a signal indicating that hibernation of the virtual machine instance is complete.

* * * * *